United States Patent [19]

Cohen et al.

[11] Patent Number: 4,997,263

[45] Date of Patent: Mar. 5, 1991

[54] AMBIENT LIGHT ILLUMINATED LIQUID CRYSTAL DISPLAY SYSTEM

[75] Inventors: Richard L. Cohen, Matawan, N.J.; Rubin Gelles, New York, N.Y.

[73] Assignee: Allied-Signal Inc., Morris Township, Morris County, N.J.

[21] Appl. No.: 364,750

[22] Filed: Jun. 12, 1989

[51] Int. Cl.$^5$ ............................................ G02F 1/13
[52] U.S. Cl. ...................................... 350/345; 350/338
[58] Field of Search ................................. 350/338, 345

[56] References Cited

U.S. PATENT DOCUMENTS

| | | | |
|---|---|---|---|
| 3,712,047 | 1/1973 | Girard | 350/345 |
| 3,838,909 | 10/1974 | Fitzgibbons | 350/345 |
| 3,966,303 | 6/1976 | Yamamoto | 350/345 |
| 4,124,279 | 11/1978 | Byles | 350/338 |
| 4,310,871 | 1/1982 | Adachi | 350/345 |
| 4,367,923 | 1/1983 | Ishikawa | 350/345 |
| 4,621,898 | 11/1986 | Cohen | 350/276 R |
| 4,723,840 | 2/1988 | Humbert et al. | 362/23 |

FOREIGN PATENT DOCUMENTS

| | | | |
|---|---|---|---|
| 3442498 | 5/1986 | Fed. Rep. of Germany | 350/345 |
| 2147444 | 5/1985 | United Kingdom . | |

*Primary Examiner*—Nelson Moskowitz
*Attorney, Agent, or Firm*—H. G. Massung; R. A. Walsh

[57] ABSTRACT

A liquid crystal display system utilizes an optical arrangement which is aligned so that ambient light from the direction of an obersver's view is channeled behind the liquid crystal display to provide back illumination therefor. An illuminator is arranged to provide supplementary illumination for the liquid crystal display as may be required. A photodetector determines when ambient light is inadequate for required display brightness and operates through appropriate control circuitry to turn the illuminator on or off as the case may be and to control the contrast of the liquid crystal display.

8 Claims, 3 Drawing Sheets

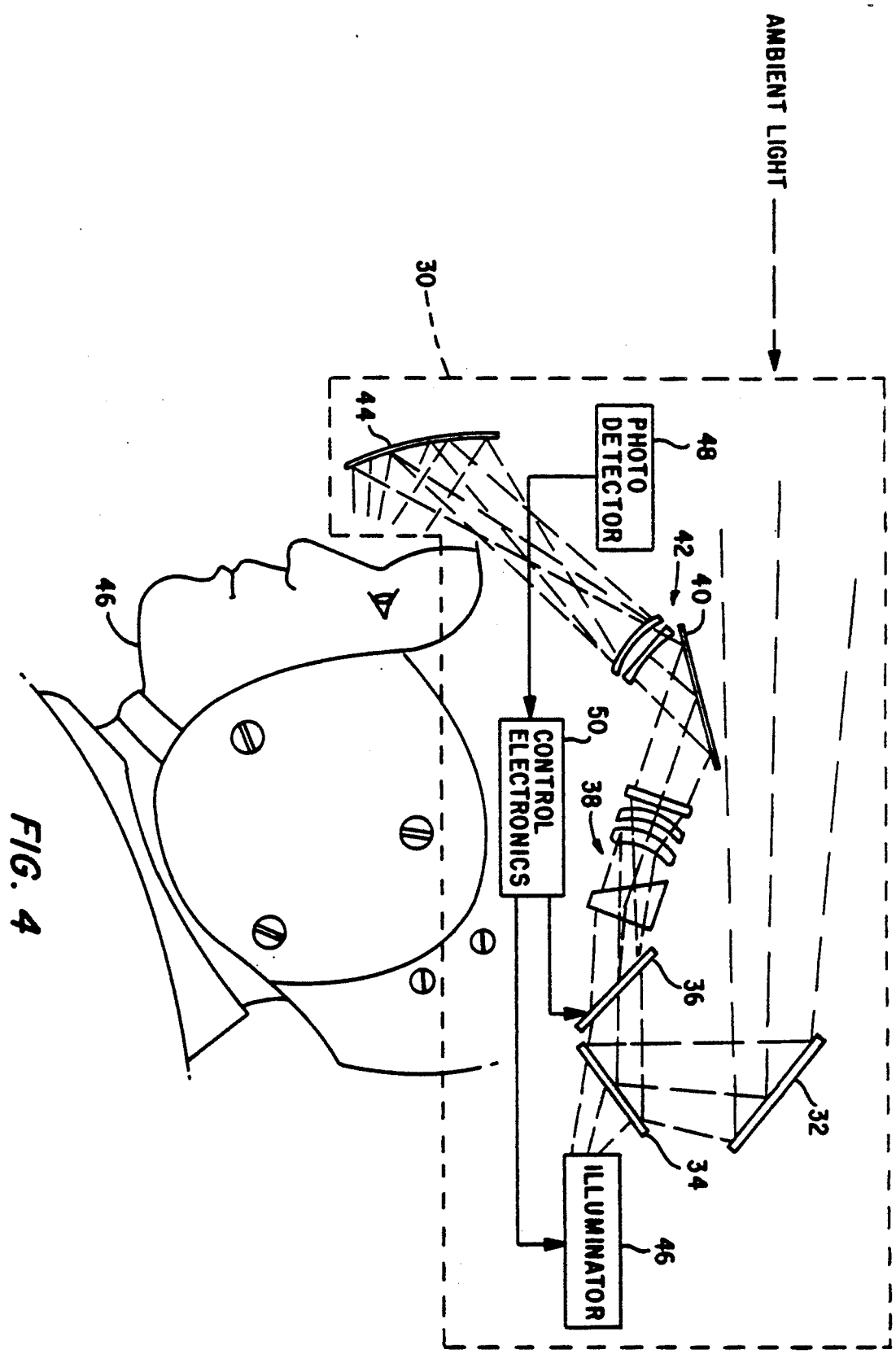

AMBIENT LIGHT ILLUMINATED LIQUID CRYSTAL DISPLAY SYSTEM

BACKGROUND OF THE INVENTION

This invention relates generally to liquid crystal display (LCD) systems and particularly to a display system of the type described wherein ambient light is channeled for illuminating the LCD. That is to say, ambient light in the forward field of an observer is channeled to the rear of the LCD to provide an image contrast ratio independent of the brightness of the ambient light whereby the display is enhanced.

Liquid crystal display systems are used, for example, for displaying navigational or strategic flight information in the field of vision of the pilot of an aircraft. In military applications the LCD system is mounted on the aircraft pilot's helmet.

LCD systems particularly for the purposes indicated use backlighting to provide illumination for the LCD under conditions of low to very high ambient light brightness. The backlighting approach works well until ambient light brightness levels in the 2,000 to 10,000 foot lambert range are encountered. Under these conditions the backlighting brightness levels required are difficult to maintain and require high power levels. The present invention overcomes this difficulty by utilizing ambient light. The ambient light is channeled to the rear of the LCD to provide a defined contrast light ratio. Under required conditions a supplementary illuminator is used in conjunction with the channeled ambient light.

SUMMARY OF THE INVENTION

This invention contemplates a liquid crystal display (LCD) system wherein an optical arrangement is aligned so that ambient light from the direction of an observer's view is channeled behind the LCD to provide backlighting therefor. An illuminator is integrated into the optical arrangement. A photodetector determines when ambient light is inadequate for desired display brightness, and operates, through appropriate control circuitry, to turn on the illuminator. The photodetector is also used to control the contrast characteristics of the LCD.

In a particular embodiment of the invention the LCD system is mounted on a helmet worn by the pilot of an aircraft. The helmet mounted system uses a pair of mirrors arranged in association with appropriate relay lenses and a third mirror. Ambient light is directed through the pair of mirrors behind an LCD for backlighting purposes. An illuminator which may be a light emitting diode (LED), is arranged with one of the pair of mirrors. A photodetector senses when ambient light is inadequate for desired display brightness and turns on the illuminator via appropriate control circuitry. The photodetector operates through the control circuitry to control the contrast characteristics of the LCD. The image from the LCD is channeled through the relay lenses and the third mirror to a collimator/combiner arrangement in the pilot's field of vision whereby the pilot views the display.

BRIEF DESCRIPTION OF THE DRAWINGS

FIG. 4 is a combination pictorial/schematic representaion illustrating a particular embodiment of the invention wherein the invention is mounted on the helmet of a pilot of an aircraft.

DETAILED DESCRIPTION OF THE INVENTION

A major poblem involving the use of a liquid crystal display (LCD) in place of, for example, a cathode ray tube (CRT) display, is the low light transmittance, requiring a source of light with a high degree of brightness. It is proposed to use ambient light as this source for providing the required contrast and thereby enhancing the display.

Figure 1:
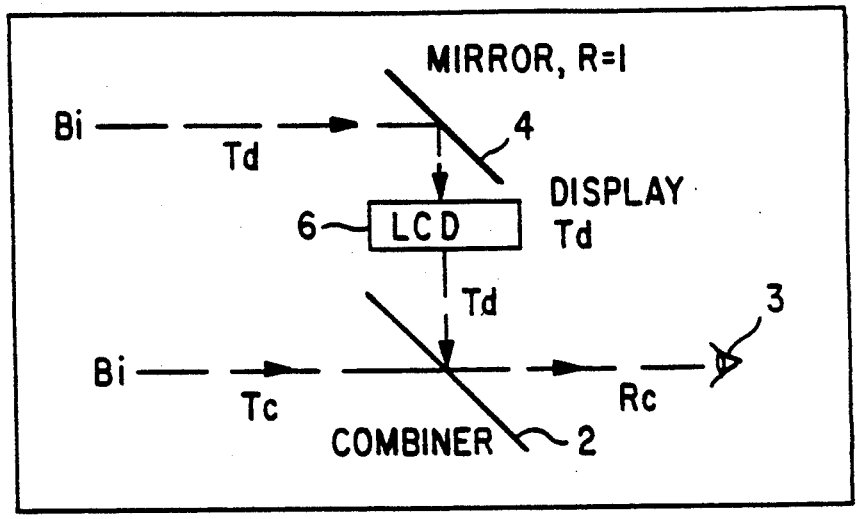
FIG. 1 is a diagrammatic representation showing the affect of the incidence of ambient light on a light beam combiner for purposes of illustrating the invention.

With reference to FIG. 1, ambient light, Bi, is incident upon a beam combiner 2 with a transmittance Tc and a reflectance Rc to an observer's eye 3. Ambient light Bi is also reflected from a mirror 4 with a reflectance Rl through an LCD 6 with a transmittance Td to beam combiner 2, and reflected by beam combiner 2 with reflectance Rc.

It is assumed that combiner 2 is nonabsorbent so that $Rc + Tc = 1$.

The apparent display brightness Bd is given by:

$$Bd = (Rc)(Td)(Bi) = (1 - Tc)(Td)(Bi).$$

The ambient brightness is:

$$Ba = (Tc)(Bi).$$

The contrast is therefore:

$$C = (Ba + Bd)/Ba;$$

$$C = [(Rc)(Td)(Bi)] + [(Tc)(Bi)/(Tc)(Bi)];$$

$$C = [(1 - Tc)(Td) + Tc]/Tc$$

Using the above expression, the contrast can be determined in terms of the transmittance of combiner 2 and LCD 6. Currently available LCD's have a transmittance of about 20%. With this value, and letting Tc vary from 100% to 10% (1.0 to 0.1), the following table results:

| Tc  | Rc  | C    |
|-----|-----|------|
| 1.0 | 0   | 1.0  |
| 0.9 | 0.1 | 1.02 |
| 0.8 | 0.2 | 1.05 |
| 0.7 | 0.3 | 1.09 |
| 0.6 | 0.4 | 1.13 |
| 0.5 | 0.5 | 1.20 |
| 0.4 | 0.6 | 1.30 |
| 0.3 | 0.7 | 1.47 |
| 0.2 | 0.8 | 1.80 |
| 0.1 | 0.9 | 2.80 |

Since the contrast requirement is usually 1.2, it will be seen from the above table that the maximum transmittance of beam combiner 2 is 50%.

The above was determined on the assumption that ambient light Bi was provided by a completely uniform background with a brightness of 10,000 foot lamberts.

However, most applications involve non-uniform backgrounds and accordingly the case in which two areas, high brightness and low brightness, exist must be considered.

Figure 2:
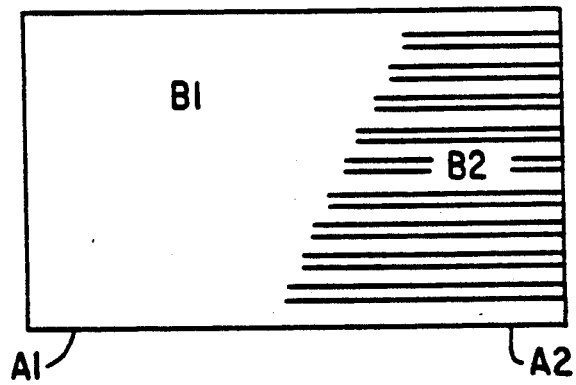
FIG. 2 is a diagrammatic representation showing two areas of varying brightness within the field of view of an observer for purposes of illustrating the invention.

With reference to FIG. 2, two areas within an observer's field of view are shown and are designated as A1 and A2. The brightness of area A1 is designated as B1 and the brightness of area A2 is designated as B2. With reference to FIG. 1, the light that traverses LCD 6 is integrated by combiner 2 between the LCD and observer's eye 3. If the total area of display is A, the following results:

$$A = A1 + A2$$
$$Bi = (A1)(B1)/A + (A2)(B2)/A;$$
$$= (A1)(B1)/A + (1 - A1/A)(B2).$$

Thus, the brightness input to the display is determined, and which input will be viewed against either A1 or A2. In general, the contrast for the two areas will differ and will be given by:

$$C1 = [(1-Tc)(Td)(Bi) + (Tc)(Bi)]/(Tc)(Bi);$$

and $$C2 = [(1-Tc)(Td)(Bi) + (Tc)(B2)]/(Tc)(B2).$$

It is useful to calculate the resulting contrasts v TC as aforenoted, while varying the relative areas of A1 and A2. To do this it is again assumed that B1=10,000 foot lamberts. B2 is considered as 1,800 foot lamberts which is based on the average scene reflectance determined by photographic scientists, the same being well known in the art. The following table shows the results of the calculation.

| A1/A | 0.75 | | 0.50 | | 0.25 | |
|---|---|---|---|---|---|---|
| Bi | 7950 | | 5900 | | 3850 | |
| Tc | C1 | C2 | C1 | C2 | C1 | C2 |
| 0.9 | 1.018 | 1.098 | 1.013 | 1.073 | 1.009 | 1.048 |
| 0.8 | 1.040 | 1.221 | 1.030 | 1.164 | 1.019 | 1.107 |
| 0.7 | 1.068 | 1.379 | 1.051 | 1.281 | 1.033 | 1.183 |
| 0.6 | 1.106 | 1.589 | 1.079 | 1.437 | 1.051 | 1.285 |
| 0.5 | 1.159 | 1.883 | 1.118 | 1.656 | 1.077 | 1.428 |
| 0.4 | 1.238 | 2.325 | 1.177 | 1.983 | 1.116 | 1.642 |
| 0.3 | 1.371 | 3.061 | 1.275 | 2.500 | 1.180 | 1.998 |
| 0.2 | 1.636 | 4.533 | 1.471 | 3.622 | 1.308 | 2.711 |
| 0.1 | 2.431 | 8.950 | 2.062 | 6.900 | 1.693 | 4.850 |

It is noted that C1 is the contrast with a bright background and C2 is the contrast with a dark background. The numbers in the above table show that it is easy to achieve the necessary dark background. The calculated results for C1 also indicate that there may be times when the observing direction precludes achieving the required brightness level against the bright background. Consequently, consideration must be given to the frequency with which such a situation can occur and how serious it may be. In order to accommodate this situation the reduction in brightness is compensated for by a supplementary light source as referred to above and as will be more fully explained with reference to FIGS. 3 and 4.

Figure 3:
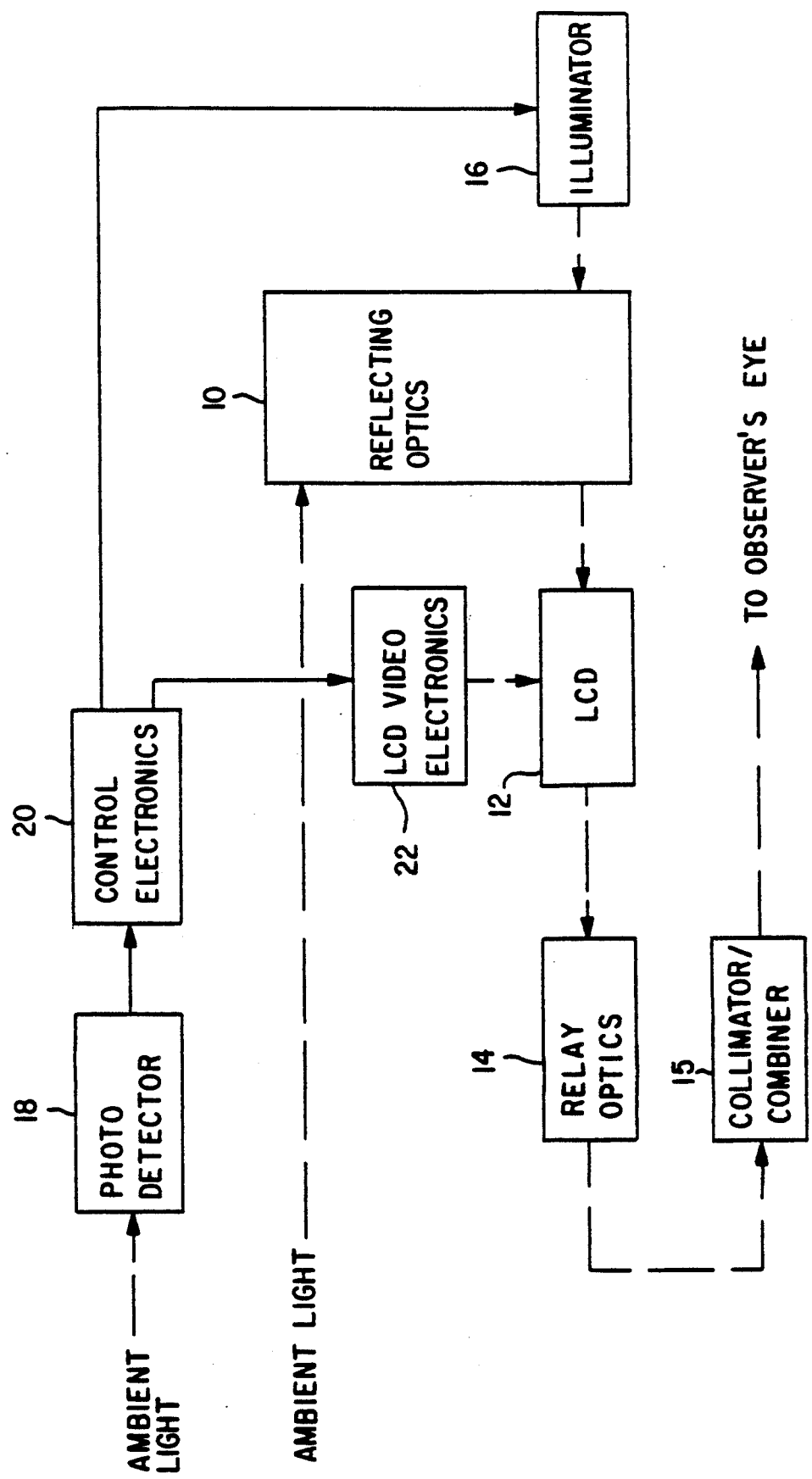
FIG. 3 is a block diagram generally showing the invention.

With reference first to FIG. 3, ambient light is received by reflecting optics 10 and transmitted therefrom to an LCD 12. The image from LCD 12 is transmitted via relay optics 14 to a collimator/combiner 15 in the field of vision of an observer and therefrom to the observer's eye. Thus, ambient light is used as the required light source with high brightness as heretofore discussed with reference to FIG. 1.

As discussed with reference to FIG. 2, the situation may occur when a supplementary light source is necessary. This is accomplished by an illuminator 16 which may be, for purposes of illustration, a light emitting diode (LED) disposed behind reflecting optics 10.

The output from illuminator 16 is applied to reflecting optics 10 as is the ambient light as aforenoted, and reflecting optics 10 which is responsive to the ambient light and the light from illuminator 16 provides an output which is applied to LCD 12. Thus, illuminator 16 compensates for any reduction in brightness that may occur as described with reference to FIG. 2.

Since it may not always be necessary to use illuminator 16 as will now be understood, a photodetector 18 senses the brightness of the ambient light and controls illuminator 16 through control electronics 20. Thus, illuminator 16 is turned on through photodetector 18 and control electronics 20 when supplementary light is needed for the purposes heretofore described, and is turned off when said supplementary light is not needed.

Control electronics 20 is also responsive to the output of photodetector 18 for providing an output which controls LCD video electronics 22 for controlling the contrast of the LCD as will now be understood by those skilled in the art.

A particular embodiment of the invention is shown in FIG. 4, wherein an LCD system designated by the numeral 30 is mounted on the helmet of a pilot of a military aircraft for displaying navigational or strategic flight information, as the case may be. FIG. 4 shows the particular structural configuration of this LCD system.

Thus, ambient light is received by a mirror 32 and reflected thereby to a mirror 34. Mirror 34 reflects the light to an LCD 36 which provides a desired image.

The image from LCD 36 is transmitted through relay lenses 38, a mirror 40 and relay lenses 42 to a collimator/combiner 44 which may be mounted on the helmet visor so as to be displaceable in and out of the field of vision of a pilot 46. The LCD so far described functions as heretofore noted with reference to FIG. 3.

An illuminator 46 is disposed behind mirror 34 so as to provide supplementary illumination thereto as may be necessary under the aforenoted specific conditions. Mirror 34 receives the ambient light reflected from mirror 32 and the supplementary light provided by illuminator 46 and transmits the combined light to LCD 36.

A photodetector 48 is mounted on the pilot's helmet so as to sense ambient light and the output of the photodetector is applied to control electronics 50. Control electronics 50 provides an output for turning illuminator 46 on or off as the case may be, and provides an output for controlling the contrast of the LCD, as aforenoted.

It will now be seen that ambient light is used to provide a display with a constant, defined contrast ratio. A photodetector determines when the ambient light is inadequate for this purpose and thereupon turns on an illuminator which provides supplementary illumination to the LCD as may be required. In the preferred embodiment of the invention the photodetector is also used to control the contrast of the LCD. It will now be understood that display brightness levels that may be required are thus achieved without high power levels as has heretofore been the case and are achieved simply and without complicated and otherwise cumbersome equipment.

In this regard it will be understood that all of the components used in the invention such as photodetectors 18 and 48, control electronics 20 and 50 and LCD video electronics 22 are commercially available and their use and function is well known to those skilled in the art. Likewise the various mirrors, reflecting optics, relay optics and the collimator/combiner are also commercially available and well known to those skilled in the art. In any event, the novelty of the invention resides in the combination of these elements and not in the elements themselves.

With the aforegoing description of the invention in mind reference is made to the claims appended hereto for a definition of the scope of the invention.

What is claimed is:

1. A liquid crystal display system, comprising:
   an optical arrangement for receiving ambient light and for reflecting the received ambient light;
   a liquid crystal display disposed ahead of the optical arrangement for being backlighted by the reflected ambient light whereby said liquid crystal display provides an image having a defined contrast light ratio;
   relay optics disposed ahead of the liquid crystal display for receiving the image having a defined contrast light ratio and for relaying said image; and
   collimator/combining means disposed ahead of the relay optics and in the field of view of an observer for receiving the relayed image and for displaying said image for viewing by the observer.

2. A liquid crystal display system as described by claim 1, including:
   illuminator means disposed behind the optical arrangement and providing a supplementary light output in compensation for a reduction in brightness of the ambient light;
   the optical arrangement receiving the ambient light and the supplementary light and reflecting said received lights; and
   the liquid crystal display disposed ahead of the optical arrangement being backlighted by the reflected ambient and supplementary lights, whereby said liquid crystal display provides the image having the defined contrast ratio.

3. A liquid crystal display system as described by claim 2, including:
   photodetector means for detecting the brightness of the ambient light and for providing a corresponding electrical output;
   control means connected to the photodetector means and responsive to the electrical output therefrom for providing a controlling output; and
   the illuminator means connected to the control means and responsive to the controlling output therefrom for being turned on when the ambient light is below a predetermined brightness and for being turned off when said ambient light is above said predetermined brightness.

4. A liquid crystal display system as described by claim 3, including:
   the control means connected to the photodetector means and responsive to the electrical output therefrom for providing an other controlling output;
   video electronics means associated with the liquid crystal display; and
   the video electronics means connected to the control means and responsive to the other controlling output for controlling the contrast of the liquid crystal display.

5. A liquid crystal display system for displaying flight data to the pilot of an aircraft, the display system mounted on a helmet worn by the pilot, said system including:
   a first mirror for receiving ambient light and for reflecting said ambient light;
   a second mirror for receiving the reflected ambient light and for reflecting the received ambient light;
   a liquid crystal display disposed ahead of the second mirror so as to be backlighted by the reflected received ambient light and for providing an image having a defined contrast light ratio;
   a collimator/combiner arranged on the helmet so as to be in the field of vision of the pilot; and
   optical relay means disposed between the liquid crystal display and the collimator/combiner for relaying the image from the liquid crystal display to the collimator/combiner which displays said image for viewing by the pilot.

6. A liquid crystal display system as described by claim 5, including:
   illuminator means disposed behind the second mirror for providing a supplementary light output in compensation for a reduction in brightness of the ambient light, said second mirror reflecting the ambient light and the supplementary light; and
   the liquid crystal display being backlighted by the ambient light and the supplementary light.

7. A liquid crystal display system as described by claim 6, including:
   photodetector means for detecting the brightness of the ambient light and for providing a corresponding electrical output;
   control means connected to the photodetector means and responsive to the electrical output therefrom for providing a controlling output; and
   the illuminator means connected to the control means and responsive to the controlling output therefrom for being turned on when the ambient light is below a predetermined brightness and for being turned off when said ambient light is above said predetermined brightness.

8. A liquid crystal display system as described by claim 7, including:
   the control means connected to the photodetector means and responsive to the electrical output therefrom for providing an other controlling output;
   the liquid crystal display means connected to the control means and responsive to the other controlling output so that the contrast of the liquid crystal display is controlled.

* * * * *